US007086313B2

(12) United States Patent
Cantlon

(10) Patent No.: US 7,086,313 B2
(45) Date of Patent: Aug. 8, 2006

(54) SCREWDRIVER CONNECTOR

(75) Inventor: Nathan C. Cantlon, Charlo, MT (US)

(73) Assignee: Jore Corporation, Pasco, WA (US)

( * ) Notice: Subject to any disclaimer, the term of this patent is extended or adjusted under 35 U.S.C. 154(b) by 40 days.

(21) Appl. No.: 11/002,713

(22) Filed: Dec. 1, 2004

(65) Prior Publication Data

US 2005/0176283 A1 Aug. 11, 2005

Related U.S. Application Data

(60) Provisional application No. 60/528,804, filed on Dec. 11, 2003.

(51) Int. Cl.
*B25B 23/00* (2006.01)
*B23B 31/12* (2006.01)
*B25G 3/02* (2006.01)

(52) U.S. Cl. .......................... 81/438; 279/905; 279/22; 279/30; 279/75

(58) Field of Classification Search .................. 81/438, 81/177.85; 279/905, 22, 30, 75, 82, 155; 408/239, 240; 409/239 R
See application file for complete search history.

(56) References Cited

U.S. PATENT DOCUMENTS 4,692,073 A * 9/1987 Martindell .............. 708/239 A
6,457,916 B1 * 10/2002 Wienhold ................... 408/240
6,722,667 B1 * 4/2004 Cantlon ....................... 279/22
2004/0262856 A1 * 12/2004 Cantlon ....................... 279/22

* cited by examiner

*Primary Examiner*—Debra S Meislin
(74) *Attorney, Agent, or Firm*—Christensen O'Connor Johnson KindnessPLLC

(57) ABSTRACT

In one aspect, the present invention provides screwdriver connectors that each include (a) a body defining (1) a first end defining a first opening and a second opening; (2) a first cavity that opens onto the first end through the first opening; (3) a second cavity, connected to the first cavity by a passage, that opens onto the first end through the second opening; (b) a locking member disposed within the passage; (c) a spring and a tensioning member disposed within the second cavity; and (d) a collar that releasably engages the first end of the body, wherein in operation the spring biases the tensioning member against the collar and against the locking member which engages a bit disposed within the first cavity, thereby immobilizing the bit within the first cavity.

17 Claims, 6 Drawing Sheets

SCREWDRIVER CONNECTOR

CROSS-REFERENCE TO RELATED APPLICATION

This application claims the benefit of U.S. Provisional Application No. 60/528,804, filed Dec. 11, 2003.

FIELD OF THE INVENTION

The present application relates to screwdrivers, and to screwdriver handles that include a connector that releasably engages a variety of screwdriver bits.

BACKGROUND OF THE INVENTION

Although some commercially available screwdrivers offer mechanisms to securely retain and lock a screwdriver bit, there are several issues of concern with these devices. One problem is the distinct separation of the screwdriver handle and the connector that engages the bit. Operation of certain locking mechanisms is accomplished by actuating a large, cylindrical, collar on the connector. The sliding collar design of these connectors prohibits the integration of the connector into the handle.

Some screwdrivers use connectors that protrude out of the handle. The placement of the connector in front of the handle produces an elongated screwdriver. This design is bulky, awkward to operate, and limits the functionality of the device.

For example, FIG. 1 shows a prior art screwdriver 10 that includes a handle 12, a connector 14 and a bit 16 having a proximal end 18 that is retained within connector 14, and a distal end 20 that is adapted to engage the head of a screw (not shown). Connector 14 is located substantially external to handle 12, thereby lengthening screwdriver 10 so that screwdriver 10 is not well adapted for use in situations where there is little space to position screwdriver 10 relative to a screw. Moreover, the elongate appearance of screwdriver 10 may be unattractive to some consumers.

The present invention provides screwdriver connectors that releasably engage a variety of bits, and that can be physically integrated (e.g., moulded or press fit) into a screwdriver handle so that little, if any, of the connector protrudes from the handle. The connector is readily actuated by a collar mounted over an end of the connector.

SUMMARY OF THE INVENTION

In one aspect, the present invention provides screwdriver connectors that each include (a) a body defining: (1) a first end defining a first opening and a second opening; (2) a first cavity that opens onto the first end through the first opening; (3) a second cavity, connected to the first cavity by a passage, that opens onto the first end through the second opening; (b) a locking member disposed within the passage; (c) a spring and a tensioning member disposed within the second cavity; and (d) a collar that releasably engages the first end of the body, wherein in operation the spring biases the tensioning member against the collar and against the locking member which engages a bit disposed within the first cavity, thereby immobilizing the bit within the first cavity.

Some screwdriver connectors of the present invention further include: (a) a third cavity that is defined by the body and that is connected to the first cavity by a second passage, and that opens onto the connector body first end through a third opening in the connector body first end; (b) a second spring and a retaining member disposed within the third cavity; and (c) a second locking member that is disposed within the second passage, wherein in operation the second spring biases the retaining member against the collar and against the second locking member which engages the bit disposed within the first cavity, thereby immobilizing the bit within the first cavity.

The screwdriver connectors of the invention can be incorporated into screwdrivers, and function to releasably engage a variety of screwdriver bits useful for introducing, or removing, different types of screws into a substrate. An advantage of the screwdriver connectors of the present invention is that they may be incorporated (e.g., moulded or press fit) into the handle of a screwdriver so that little, if any, of the connector protrudes out of the handle. Thus, screwdrivers that include a connector of the present invention are less bulky than an otherwise equivalent screwdriver that includes a connector that substantially protrudes from the handle.

Accordingly, in another aspect, the present invention provides screwdrivers that each include a handle that includes a connector of the present invention. The screwdrivers of this aspect of the invention can be used to introduce and/or remove screws from a substrate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In one aspect, the present invention provides a screwdriver connector that includes (a) a body defining (1) a first end defining a first opening and a second opening; (2) a first cavity that opens onto the first end through the first opening; (3) a second cavity, connected to the first cavity by a passage, that opens onto the first end through the second opening; (b) a locking member disposed within the passage; (c) a spring and a tensioning member disposed within the second cavity; and (d) a collar that releasably engages the first end of the body, wherein in operation the spring biases the tensioning member against the collar and against the locking member which engages a bit disposed within the first cavity, thereby immobilizing the bit within the first cavity.

Figure 1:
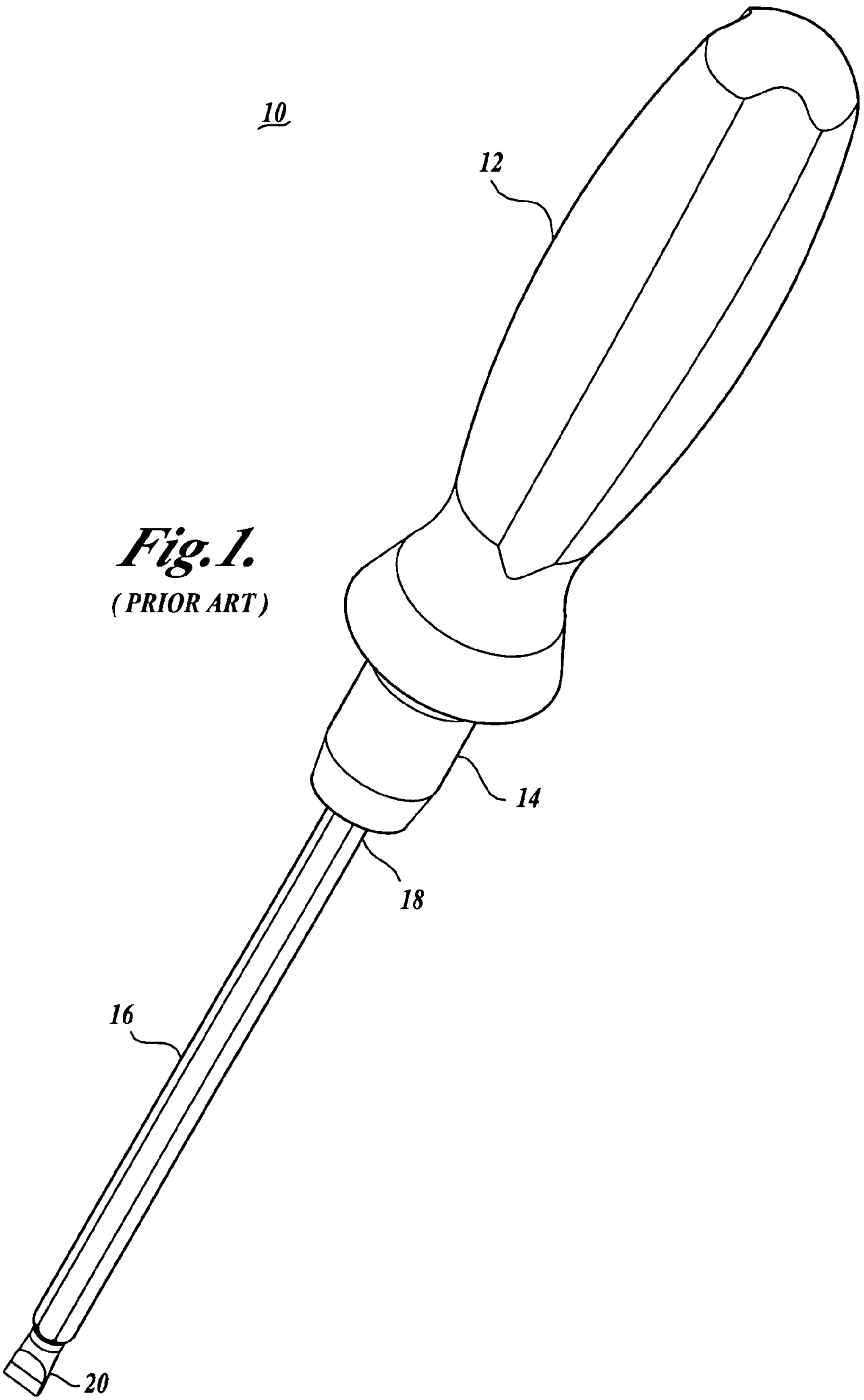
Fig.1. (PRIOR ART)
FIG. 1 shows a prior art screwdriver wherein the connector is located substantially external to the screwdriver handle.
Figure 2:
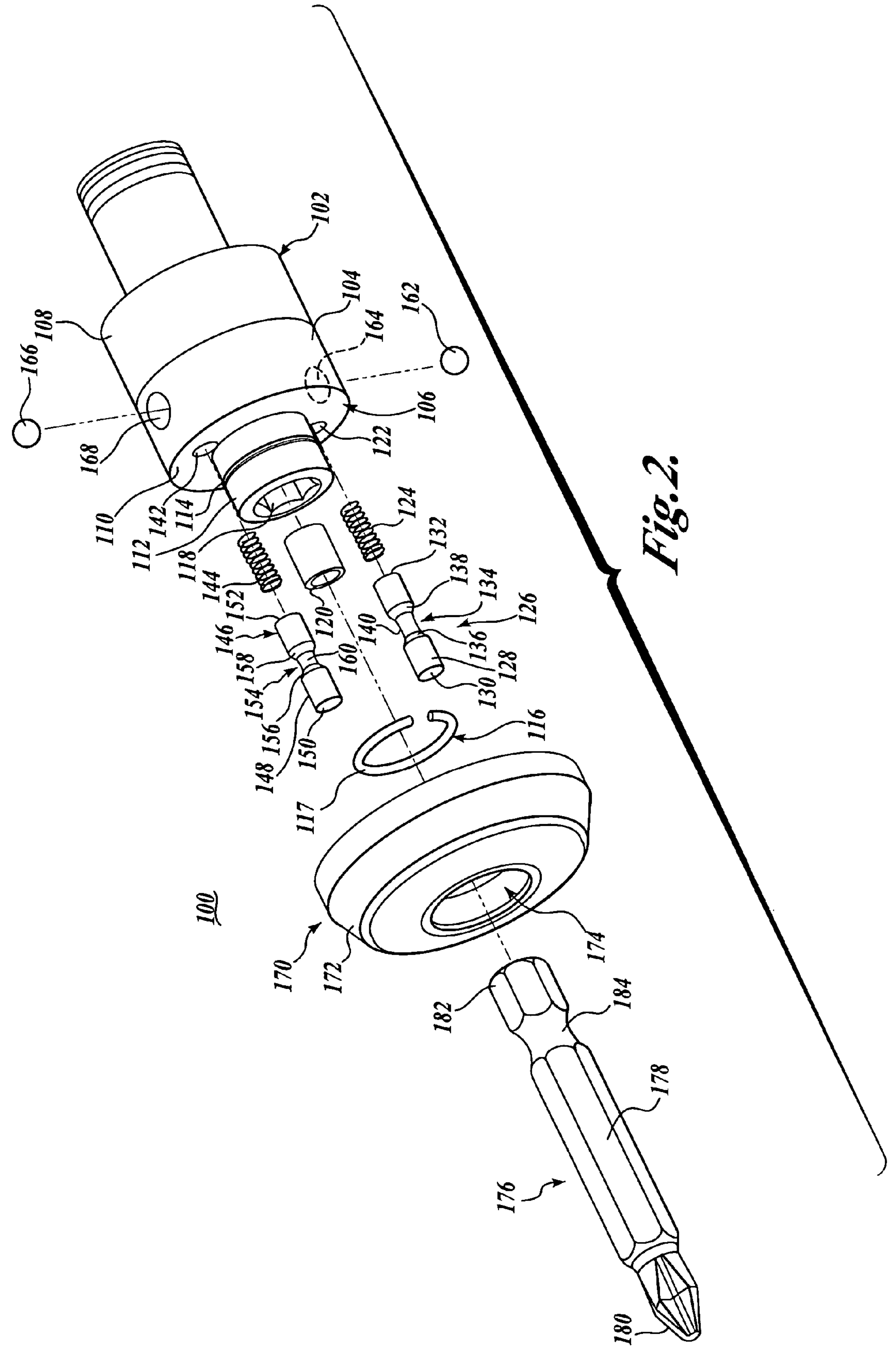
FIG. 2 shows an exploded view of a screwdriver connector of the present invention.

FIG. 2 shows an exploded view of a connector 100 of the present invention. Connector 100 includes a body 102, including a body wall 104, a first end 106, and a second end 108. First end 106 includes a planar portion 110 and a generally cylindrical extended portion 112 that extends outwardly from planar portion 110. A groove 114 extends around the circumference of extended portion 112. A retaining spring 116, comprising a spring body 117, fits within groove 114. Groove 114 is deeper than the thickness of spring body 117.

Figure 3:
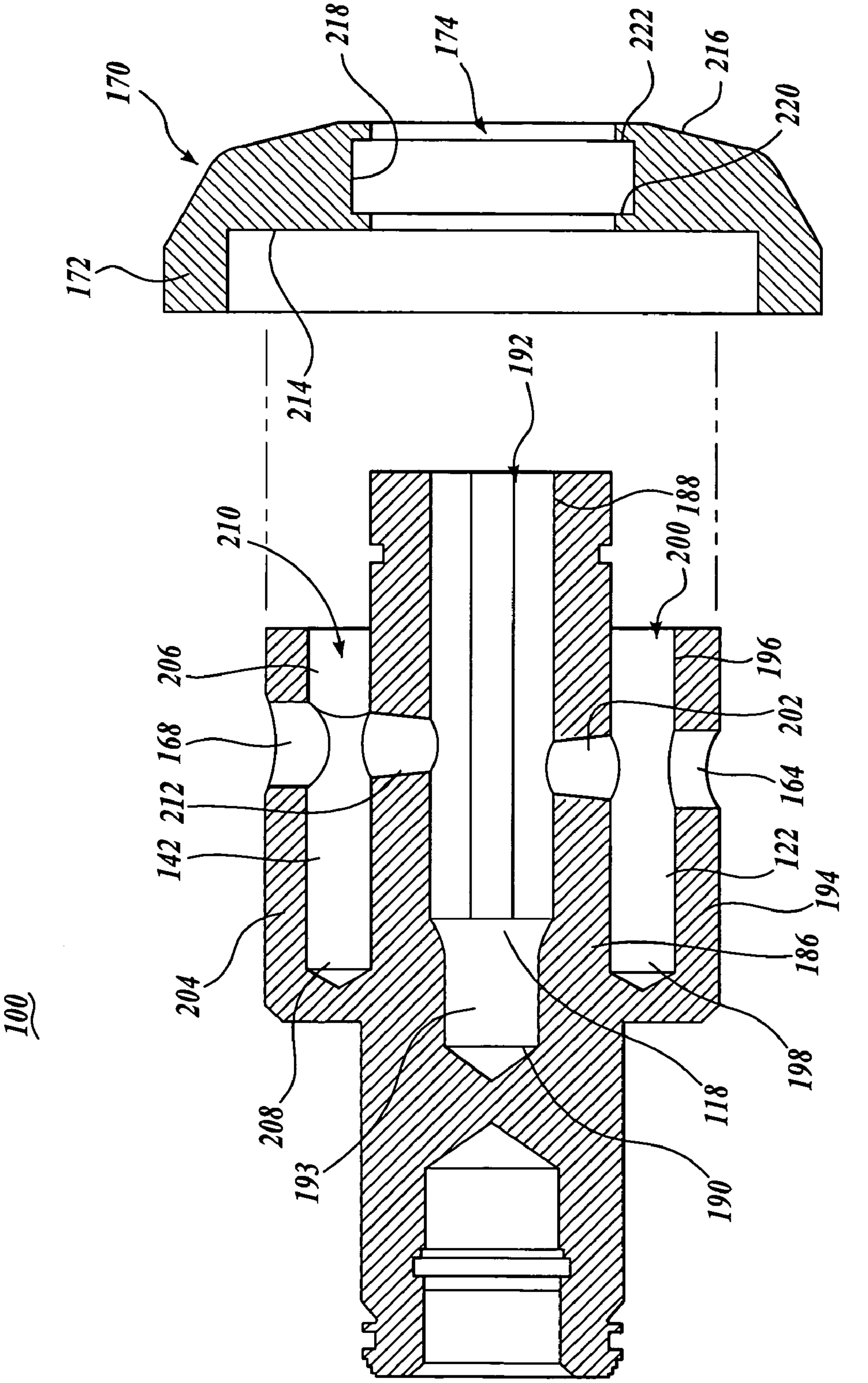
FIG. 3 shows a longitudinal cross-sectional view of the connector, shown in FIG. 2, showing the arrangement of the cavities and openings therein.

Body 102 defines a first cavity 118 (that has a hexagonal transverse cross section), and that is described more fully in FIG. 3. First cavity 118 is coaxial with body 102, and opens onto extended portion 112 of connector body first end 106. A plug 120 is optionally disposed within first cavity 118. Body 102 defines a generally cylindrical second cavity 122 (described more fully in FIG. 3) that is disposed parallel to first cavity 118, and that opens onto planar portion 110 of connector body first end 106. Second cavity 122 receives a first spring 124 and a tensioning member 126. Tensioning member 126 is generally cylindrical and includes a tensioning member body 128 having a first end 130, and a second end 132. Tensioning member body 128 defines an indentation 134 that extends around tensioning member body 128. Indentation 134 includes a first sloping portion 136 and a second sloping portion 138. An intermediate portion 140 is located between first sloping portion 136 and second sloping portion 138.

Body 102 also defines a generally cylindrical third cavity 142 (described more fully in FIG. 3) that is disposed parallel to first cavity 118, and that opens onto planar portion 110 of connector body first end 106. Third cavity 142 receives a second spring 144 and a retaining member 146. Retaining member 146 is generally cylindrical and includes a retaining member body 148 having a first end 150, and a second end 152. Retaining member body 148 defines an indentation 154 that extends around retaining member body 148. Indentation 154 includes a first sloping portion 156 and a second sloping portion 158. An intermediate portion 160 is located between first sloping portion 156 and second sloping portion 158. First sloping portion 156 and second sloping portion 158 of retaining member body 148 slope at a more acute angle than first sloping portion 136 and second sloping portion 138 of tensioning member body 128.

A first locking member 162, in the form of a sphere (e.g., metal ball bearing), may be introduced into connector 100 through a first connector body wall opening 164 (shown more clearly in FIG. 3). A second locking member 166, in the form of a sphere (e.g., metal ball bearing), may be introduced into connector 100 through a second connector body wall opening 168.

Connector 100 also includes a collar 170 that includes a collar body 172 that defines an aperture 174 that receives a bit 176. Bit 176 is not part of connector 100, but is shown to facilitate description of the function and operation of connector 100. Bit 176 includes a hexagonal bit body 178 having a screwdriver head 180, for engaging a screw, an end portion 182 that contacts plug 120 when bit 176 is fully inserted within first cavity 118, and a bit groove 184 that receives at least a portion of first locking member 162 and second locking member 166 when connector 100 is in the locked configuration, as described more fully herein.

FIG. 3 shows a longitudinal cross-sectional view of connector 100 showing the arrangement of cavities and openings therein, and additional features of collar 170. First cavity 118 includes a cavity wall 186 that extends around first cavity 118, a first end 188 and a second end 190. First cavity first end 188 opens onto body first end 106 through an opening 192 in extended portion 112 of body first end 106. First cavity 118 includes a narrower portion 193 that receives plug 120.

Second cavity 122 includes a cavity wall 194 that extends around second cavity 122, a first end 196 and a second end 198. Second cavity first end 196 opens onto body first end 106 through a second opening 200 in planar portion 110 of body first end 106. A first passage 202 connects first cavity 118 and second cavity 122. First passage 202 narrows towards first cavity 118. First body wall opening 164 penetrates body wall 104 and thereby connects second cavity 122 with the environment external to body 102.

Third cavity 142 includes a cavity wall 204 that extends around third cavity 142, a first end 206 and a second end 208. Third cavity first end 206 opens onto body first end 106 through a third opening 210 in planar portion 110 of body first end 106. A second passage 212 connects first cavity 118 and third cavity 142. Second passage 212 narrows towards first cavity 118. Second body wall opening 168 penetrates body wall 104 and thereby connects third cavity 142 with the environment external to body 102.

Collar 170 includes collar body 172 that defines an internal face 214 and an external face 216. Generally circular collar aperture 174 penetrates collar body 172 and connects internal face 214 and external face 216. Collar aperture 174 includes a recessed portion 218 disposed within collar body 172 and defined by an inner lip 220 and an outer lip 222.

Figure 4:
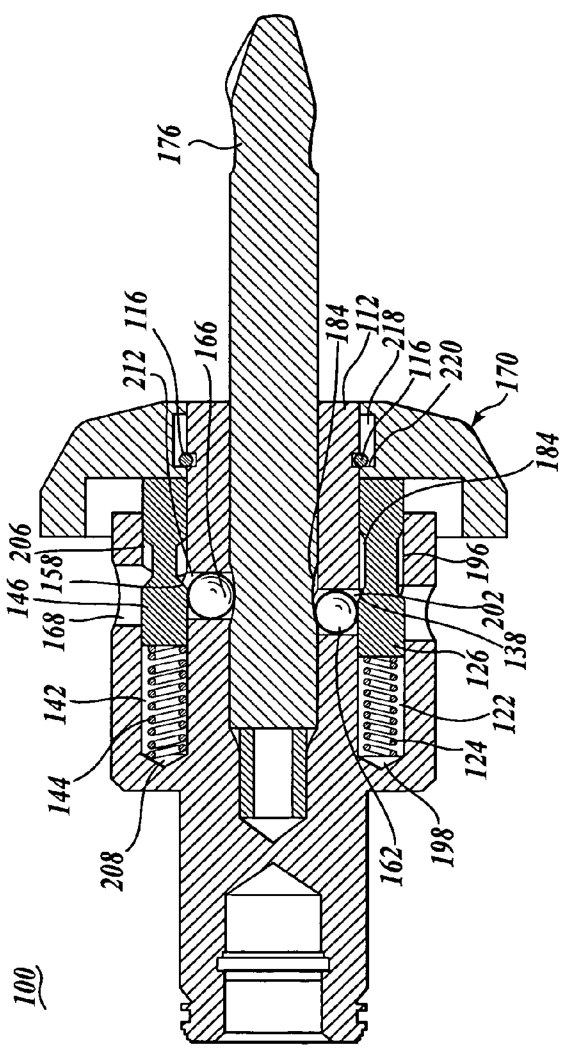
FIG. 4 shows a longitudinal cross-sectional view of the connector, shown in FIG. 2, in the locked configuration, wherein a bit is fixedly retained within the connector.
Figure 5:
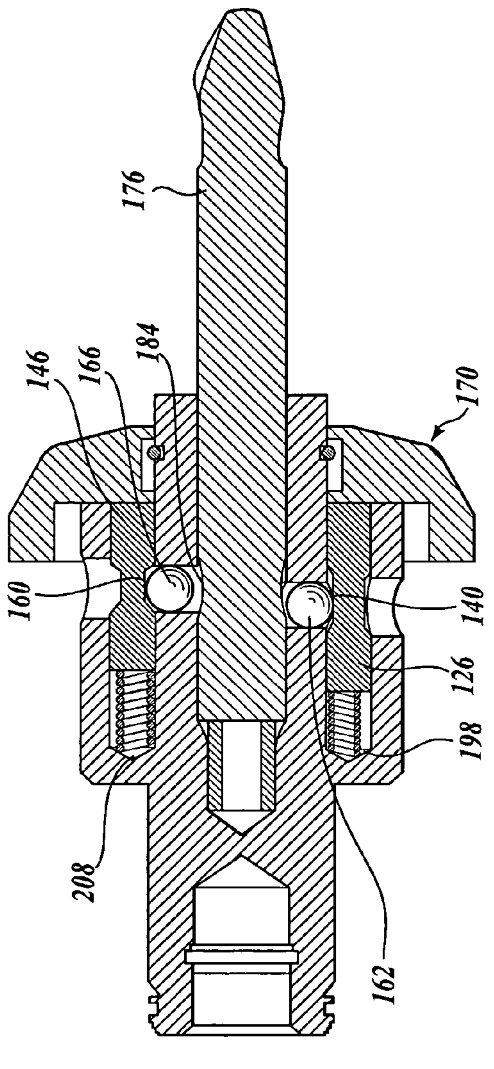
FIG. 5 shows a longitudinal cross-sectional view of the connector, shown in FIG. 2, in the unlocked configuration, wherein the bit is present within the connector, but is not fixedly retained therein.

To facilitate description of the operation of connector 100, FIGS. 4 and 5 show bit 176 disposed within first cavity 118. FIG. 4 shows connector 100 in the locked configuration, wherein bit 176 is fixedly retained within connector 100. As shown in FIG. 4, first spring 124 is disposed within second cavity 122 proximate to second cavity second end 198. Tensioning member 126 is disposed within second cavity 122 proximate to second cavity first end 196. Tensioning member 126 is located adjacent to first passage 202. First locking member 162 is disposed within first passage 202. First passage 202 narrows towards first cavity 118, thereby preventing first locking member 162 from exiting first passage 202 and completely entering first cavity 118.

Second spring 144 is disposed within third cavity 142 proximate to third cavity second end 208. Retaining member 146 is disposed within third cavity 142 proximate to third cavity first end 206. Retaining member 146 is located adjacent to second passage 212. Second locking member 166 is disposed within second passage 212. Second passage 212 narrows towards first cavity 118, thereby preventing second locking member 166 from exiting second passage 212 and completely entering first cavity 118.

Collar 170 is disposed over and around extended portion 112 of connector body 102 so that extended portion 112 completely or partially penetrates collar aperture 174, and at least a portion of retaining spring 116 is disposed within recessed portion 218 of collar aperture 174. In this regard, it is noted that groove 114 is deeper than the thickness of spring body 117. Thus, during assembly of connector 100, retaining spring 116 is compressed and is thereby completely seated within groove 114 to permit collar 170 to pass over retaining spring 116. When collar 170 has passed over retaining spring 116 during assembly, then retaining spring 116 regains its uncompressed dimensions and at least a portion of retaining spring 116 protrudes out of groove 114 and prevents collar 170 from sliding off extended portion 112 of connector body 102.

In the locked configuration, first spring 124 displaces tensioning member 126 towards collar 170, thereby displacing collar 170 so that retaining spring 116 abuts inner lip 220 of collar aperture 174, thereby securing collar 170 on extended portion 112 of body first end 106. Displacement of tensioning member 126 by first spring 124 also causes second sloping portion 138 of tensioning member 126 to displace first locking member 162 within first passage 202 so that first locking member 162 engages bit groove 184. Thus, bit 176 is immobilized within first cavity 118 by the tension applied to bit groove 184 by first locking member 162.

Also, in the locked configuration, second spring 144 biases retaining member 146 against collar 170, thereby displacing collar 170 so that retaining spring 116 abuts inner lip 220 of collar aperture 174, thereby retaining collar 170 on extended portion 112 of body first end 106. The displacement of retaining member 146 toward collar 170 also causes second sloping portion 158 of retaining member 146 to displace second locking member 166 within second passage 212 so that second locking member 166 engages bit groove 184, thereby further immobilizing bit 176 within first cavity 118.

FIG. 5 shows connector 100 in the unlocked configuration wherein bit 176 is not fixedly retained within first cavity 118 and may be removed therefrom. To unlock connector 100, and release bit 176, collar 170 is physically displaced (e.g., manually pushed) towards planar portion 110 of body first end 106. Tensioning member 126 is thereby displaced towards second cavity second end 198, permitting at least part of first locking member 162 to become seated within intermediate portion 140 of tensioning member 126. Additionally, retaining member 146 is displaced towards third cavity second end 208 permitting at least part of second locking member 166 to become seated within intermediate portion 160 of retaining member 146. Consequently, neither first locking member 162 or second locking member 166 (or portions thereof) is located within bit groove 184, and bit 176 may be withdrawn from first cavity 118. While connector 100 is in the unlocked configuration a different bit may be introduced into first cavity 118 and fixedly retained therein by permitting collar 170 to move into the locked configuration (e.g., by releasing the manual pressure on collar 170 that is physically displacing collar 170 towards planar portion 110 of body first end 106).

In connector 100 retaining member 146 functions mainly, but not exclusively, to lock collar 170 onto extended portion 112 of body first end 106. Retaining member 146 also contributes to immobilizing bit 176 within first cavity 118 by biasing second locking member 166 into bit groove 184. Tensioning member 126 functions mainly, but not exclusively, to immobilize bit 176 within first cavity 118 by biasing first locking member 162 into bit groove 184. Tensioning member 126 also contributes to locking collar 170 onto extended portion 112 of body first end 106.

Figure 6:
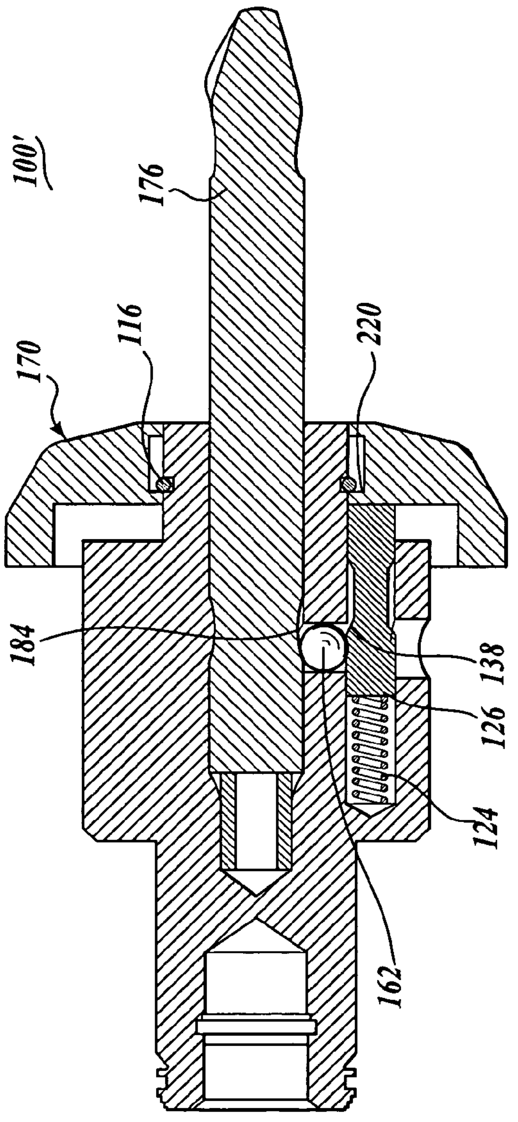
FIG. 6 shows a longitudinal cross-sectional view of an embodiment of a connector of the present invention, in the locked configuration, that does not include a retaining member.

Some embodiments of connector 100 do not include retaining member 146. The action of first spring 124, tensioning member 126 and first locking member 162 fixedly retains bit 176 within connector 100, and locks collar 170 onto extended portion 112 of body first end 106. For example, FIG. 6 shows a connector 100', in the locked configuration, that lacks retaining member 146, second spring 144, third cavity 142, second passage 212, second locking member 166 and second body wall opening 168. Thus, in the locked configuration, wherein bit 176 is fixedly retained within first cavity 118, first spring 124 biases tensioning member 126 against collar 170. Retaining spring 116 abuts inner lip 220 of collar aperture 174 thereby securing collar 170 on extended portion 112 of body first end 106. The displacement of tensioning member 126 towards collar 170, by the action of first spring 124, causes second sloping portion 138 of tensioning member 126 to displace first locking member 162 within first passage 202 and thereby engage bit groove 184. Thus, bit 176 is immobilized within first cavity 118 by the tension applied by first locking member 162.

Figure 7:
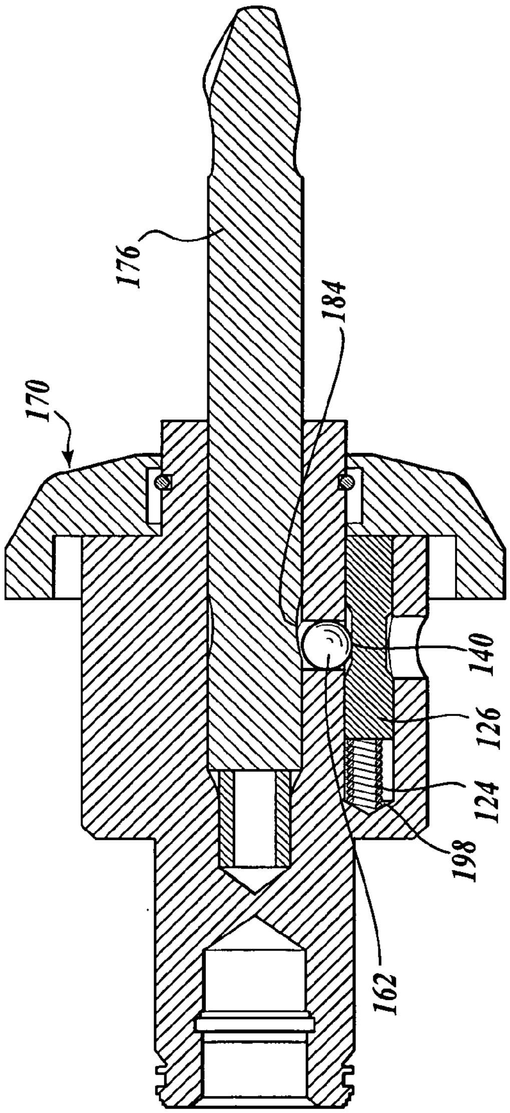
FIG. 7 shows a longitudinal cross-sectional view of an embodiment of a connector of the present invention, in the unlocked configuration, that does not include a retaining member.

FIG. 7 shows connector 100' in the unlocked configuration, wherein bit 176 is not fixedly retained within first cavity 118 and may be removed therefrom. To unlock connector 100, and release bit 176, collar 170 is physically displaced (e.g., manually pushed) towards planar portion 110 of body first end 106. Tensioning member 126 is thereby displaced towards second cavity second end 198 permitting at least part of first locking member 162 to become seated within intermediate portion 140 of tensioning member 126. Consequently, a portion of first locking member 162 is no longer located within bit groove 184, and bit 176 may be withdrawn from first cavity 118. While connector 100' is in the unlocked configuration a different bit may be introduced into first cavity 118 and fixedly retained therein by permitting collar 170 to move into the locked configuration (e.g., by releasing the manual pressure on collar 170 that is physically displacing collar 170 towards planar portion 110 of body first end 106).

Connectors 100 and 100', and their components, are made from materials that can withstand the forces applied to them during operation. Typically, connectors 100 and 100', and their components, are made from metal, such as steel, stainless steel or aluminum.

In another aspect, the present invention provides screwdrivers that each include a handle that includes a connector that includes (a) a body defining (1) a first end defining a first opening and a second opening; (2) a first cavity that opens onto the first end through the first opening; (3) a second cavity, connected to the first cavity by a passage, that opens onto the first end through the second opening; (b) a locking member disposed within the passage; (c) a spring and a tensioning member disposed within the second cavity; and (d) a collar that releasably engages the first end of the body, wherein in operation the spring biases the tensioning member against the collar and against the locking member which engages a bit disposed within the first cavity, thereby immobilizing the bit within the first cavity. All embodiments of the connectors of the present invention can be used in the screwdrivers of the invention.

Figure 8:
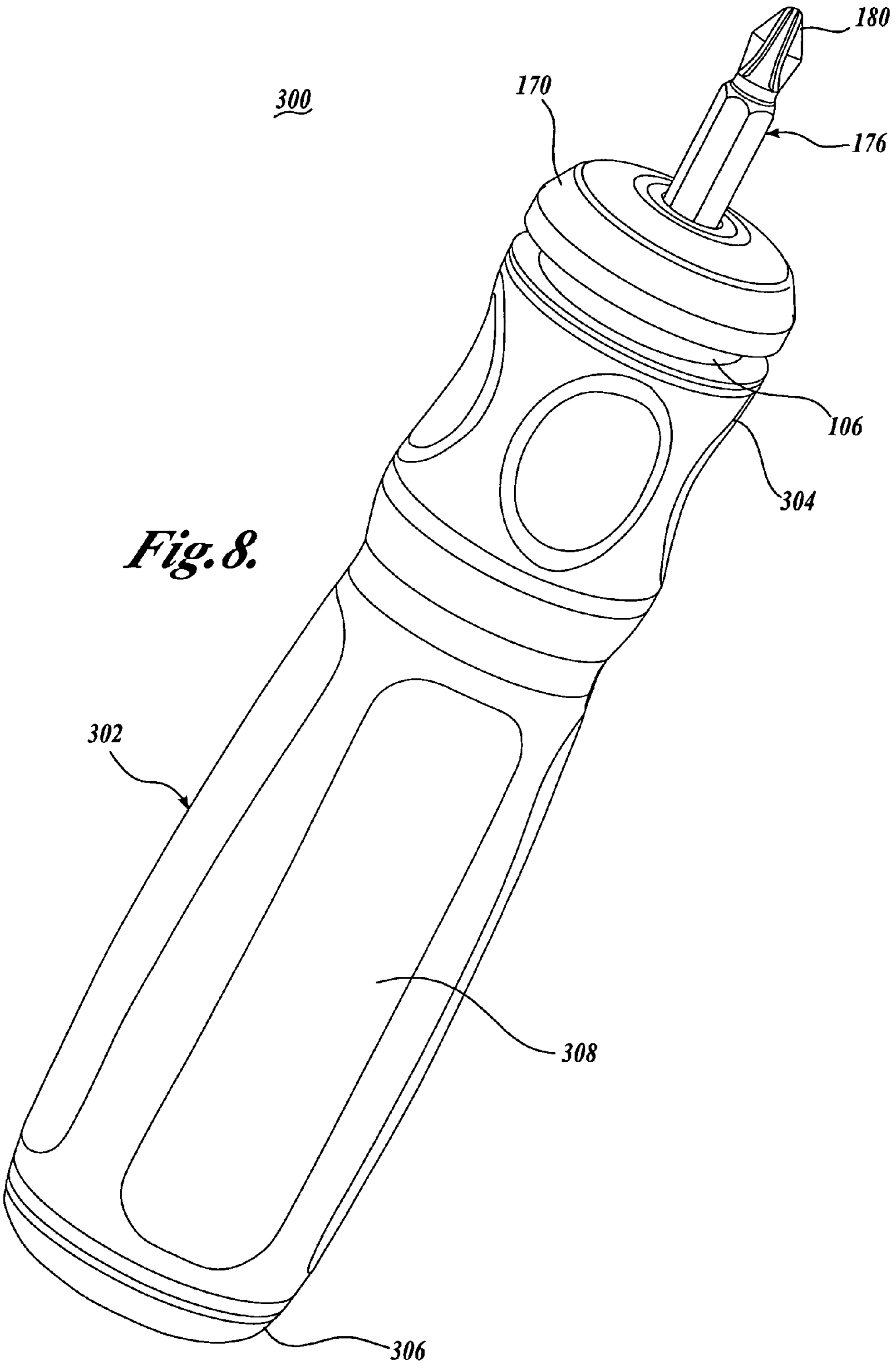
FIG. 8 shows a perspective view of a representative embodiment of a screwdriver of the present invention.

FIG. 8 shows a perspective view of a screwdriver 300 of the present invention. Screwdriver 300 includes a body 302 defining a first end 304, a second end 306, and a surface 308, extending around body 302, that is shaped to facilitate the grip of a user. Connector 100 is almost completely located within screwdriver body 302. Connector body first end 106 protrudes from first end 304 of screwdriver body 302. Collar 170 is seated over, and releasably engages, connector first end 106. Bit 176 is releasably engaged by connector 100.

In operation, a user grips surface 308 of body 302 and engages the head of a screw with screwdriver head 180. The user may use screwdriver 300 to introduce a screw into a substrate, or remove a screw from a substrate. As described more fully herein, the user can remove bit 176 from screwdriver 300 by pushing collar 170 towards screwdriver body 302 (and towards connector 100) so that connector 100 releases bit 176. The user can insert a different bit into connector 100 when collar 170 is pushed against body first end 106. Bit 176 is engaged by connector 100 when collar is released. As shown in FIG. 8, screwdriver 300 is relatively compact because most of connector 100 is disposed within screwdriver body 302.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A screwdriver connector comprising:
(a) a body defining:
(1) a first end defining a first opening and a second opening;
(2) a first cavity that opens onto the first end through the first opening;
(3) a second cavity, connected to the first cavity by a passage, that opens onto the first end through the second opening;
(b) a locking member disposed within the passage;
(c) a spring and a tensioning member disposed within the second cavity; and
(d) a collar that releasably engages the first end of the body, wherein in operation the spring biases the tensioning member against the collar and against the locking member which engages a bit disposed within the first cavity, thereby immobilizing the bit within the first cavity.

2. A screwdriver connector of claim 1 wherein (1) the body first end comprises an extended portion that comprises a groove extending around the extended portion, and (2) the connector further comprises a retaining spring disposed in the groove, wherein in operation the spring biases the tensioning member against the collar so that the collar engages the retaining spring thereby retaining the collar on the extended portion of the body first end.

3. A screwdriver connector of claim 1 wherein the first cavity is coaxial with the connector body.

4. A screwdriver connector of claim 1 wherein (1) the first cavity comprises a first end proximal to the first opening, and a second end distal to the first opening, and (2) a plug is disposed in the first cavity, wherein, in operation, the plug is disposed within the first cavity between the second end of the first cavity and the bit.

5. A screwdriver connector of claim 1 wherein the first cavity is disposed parallel to the second cavity.

6. A screwdriver connector of claim 1 wherein the locking member is a sphere.

7. A screwdriver connector of claim 6 wherein the locking member is a metal ball bearing.

8. A screwdriver connector of claim 1 wherein the tensioning member comprises a body comprising an indentation that receives at least a portion of the locking member.

9. A screwdriver connector of claim 1 wherein:
(a) the body further defines a third cavity that is connected to the first cavity by a second passage, and that opens onto the connector body first end through a third opening in the connector body first end;
(b) a second spring and a retaining member are disposed within the third cavity;
(c) a second locking member is disposed within the second passage, wherein in operation the second spring biases the retaining member against the collar and against the second locking member which engages the bit disposed within the first cavity, thereby immobilizing the bit within the first cavity.

10. A screwdriver connector of claim 9 wherein the third cavity is disposed parallel to the first cavity.

11. A screwdriver connector of claim 9 wherein the second locking member is a sphere.

12. A screwdriver connector of claim 11 wherein the second locking member is a metal ball bearing.

13. A screwdriver connector of claim 9 wherein the retaining member comprises a body comprising an indentation that receives at least a portion of the second locking member.

14. A screwdriver comprising a handle that comprises a connector that comprises:
(a) a body defining:
(1) a first end defining a first opening and a second opening;
(2) a first cavity that opens onto the first end through the first opening;
(3) a second cavity, connected to the first cavity by a passage, that opens onto the first end through the second opening;
(b) a locking member disposed within the passage;
(c) a spring and a tensioning member disposed within the second cavity; and
(d) a collar that releasably engages the first end of the body, wherein in operation the spring biases the tensioning member against the collar and against the locking member which engages a bit disposed within the first cavity, thereby immobilizing the bit within the first cavity.

15. A screwdriver of claim 10 further comprising a bit disposed within the first cavity.

16. A screwdriver of claim 10 wherein:
(a) the connector body further defines a third cavity that is connected to the first cavity by a second passage, and that opens onto the connector body first end through a third opening in the connector body first end;
(b) a second spring and a retaining member are disposed within the third cavity;
(c) a second locking member is disposed within the second passage, wherein in operation the second spring biases the retaining member against the collar and against the second locking member which engages the bit disposed within the first cavity, thereby immobilizing the bit within the first cavity.

17. A screwdriver of claim 16 further comprising a bit disposed within the first cavity.

* * * * *